United States Patent

Christian et al.

[11] Patent Number: 5,918,030
[45] Date of Patent: *Jun. 29, 1999

[54] DEVICE FOR EXECUTING A PROGRAM OF INSTRUCTIONS

[75] Inventors: Piguet Christian, Neuchatel; Perotto Jean-Félix, Colombier; Marchal Pierre, Lausanne, all of Switzerland

[73] Assignee: C.S.E.M. - Centre Suisse E'Electronique et de Microtechnique SA, Neuchatel, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/548,206

[22] Filed: Oct. 25, 1995

[30] Foreign Application Priority Data

Oct. 25, 1994 [FR] France .................... 94 12741

[51] Int. Cl.$^6$ ...................... G06F 9/40
[52] U.S. Cl. ............................ 395/382
[58] Field of Search ................. 395/582, 584, 395/391, 380, 382

[56] References Cited

U.S. PATENT DOCUMENTS

| 4,694,407 | 9/1987 | Ogden | 395/141 |
| 5,127,091 | 6/1992 | Boufarah et al. | 395/585 |

FOREIGN PATENT DOCUMENTS 0315995 5/1989 European Pat. Off. .
0570164 11/1993 European Pat. Off. .

OTHER PUBLICATIONS

"Machine Organization of the IBM Risc SyStem/6000 Processor", IBM Journal of Research and Development, vol. 34, No. 1, Jan. 1990, pp. 37–58.
"Cache Organization to Maximize Fetch Bandwidth", IBM Technical Disclosure Bulletin, vol. 32, No. 2, Jul. 1989.
"DSNS (Dynamically–Hazard–Resolved, Statically–Code–Scheduled, Nonuniform Superscalar): Yet Another Superscalar Processor Architecture", Computer Architecture News, vol. 19, No. 4.

Primary Examiner—David Y. Eng

[57] ABSTRACT

The device comprises $2^n$ memories (Mi) or memory areas in parallel, among which the A instructions are distributed, a unit (UT) for processing these instructions and a management unit (DI, AC) sensitive to a jump instruction extracted from one of the memories in order to disrupt the ordered activation of memories and in its place to activate the memory containing the address given in the jump instruction, and to cause the instruction placed at this address to be delivered to the processing unit (UT). The n least significant bits (LSB) of said M-bit address identify the memory (Mi) or the memory area containing this address, while the (M-n) most significant bits (MSB) identify one of $2^{M-n}$ rows of $2^n$ addresses each taken from one of the $2^n$ memories. The management unit a control automaton (AC) sensitive to the n (LSB) bits of the address in order to activate the memory containing said address and to cause the instruction which is located there, in the row identified by the (M-n) (MSB) bits, to be delivered to the processing unit.

12 Claims, 15 Drawing Sheets

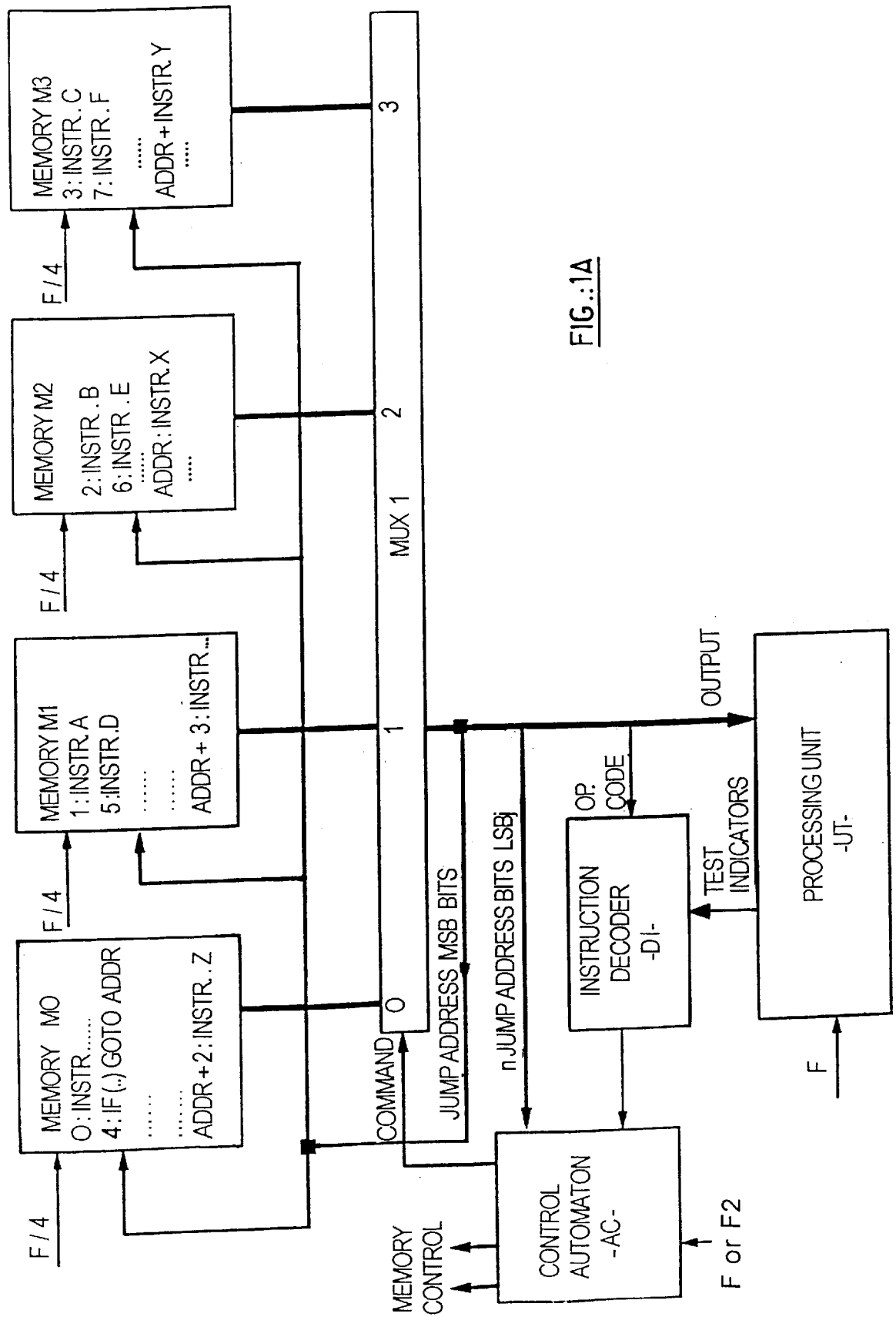
FIG.:1A

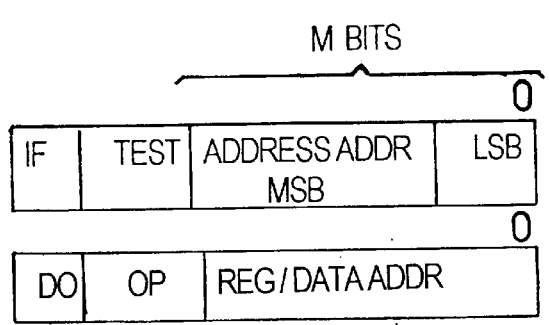
FIG.: 1B
```
PROGRAM
0 : INSTR......
1 : INSTR. A
2 : INSTR. B
3 : INSTR. C
4 : IF(..) GOTO ADDR
5 : INSTR. D
6 : INSTR. E
......
......
ADDR : INSTR. X
     : INSTR. Y
     : INSTR. Z
```
FIG.: 1C
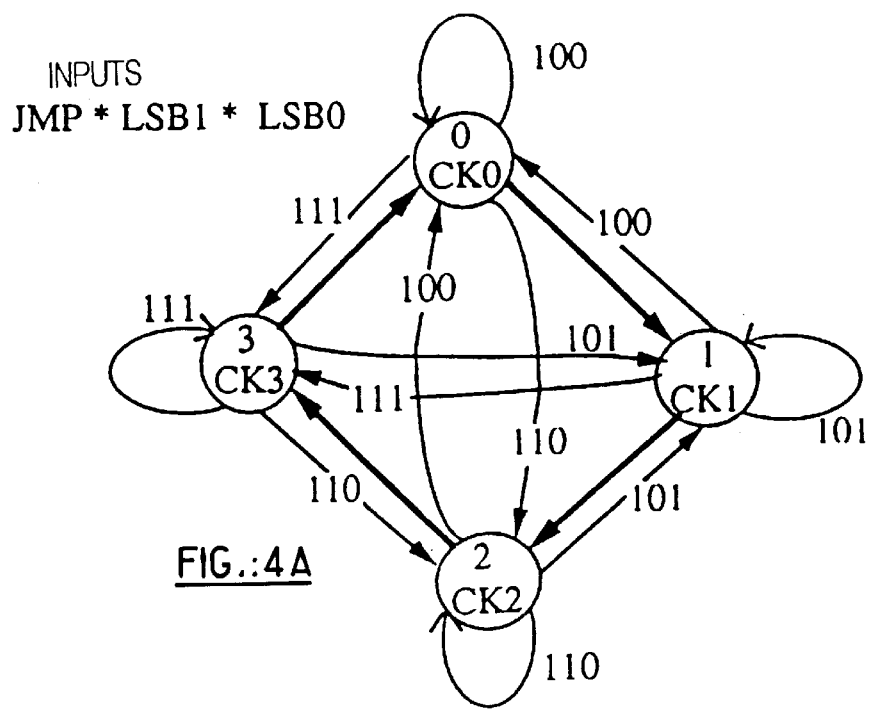
FIG.: 4A
FIG.: 4C
| STATE | INC 0 | INC 1 | INC 2 |
|---|---|---|---|
| 0 | 0 | 0 | 0 |
| 1 | 1 | 0 | 0 |
| 2 | 1 | 1 | 0 |
| 3 | 1 | 1 | 1 |

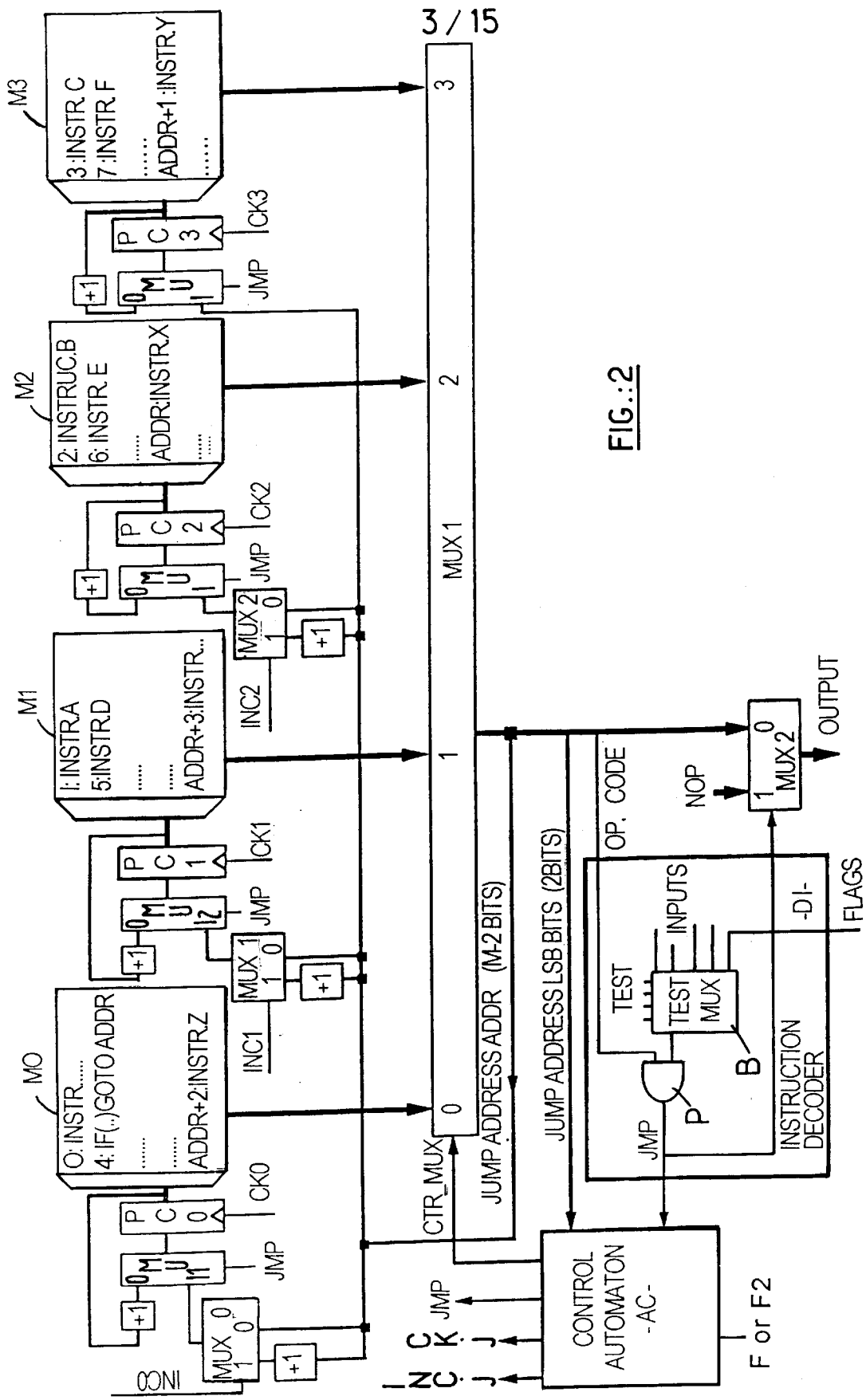
FIG.:2

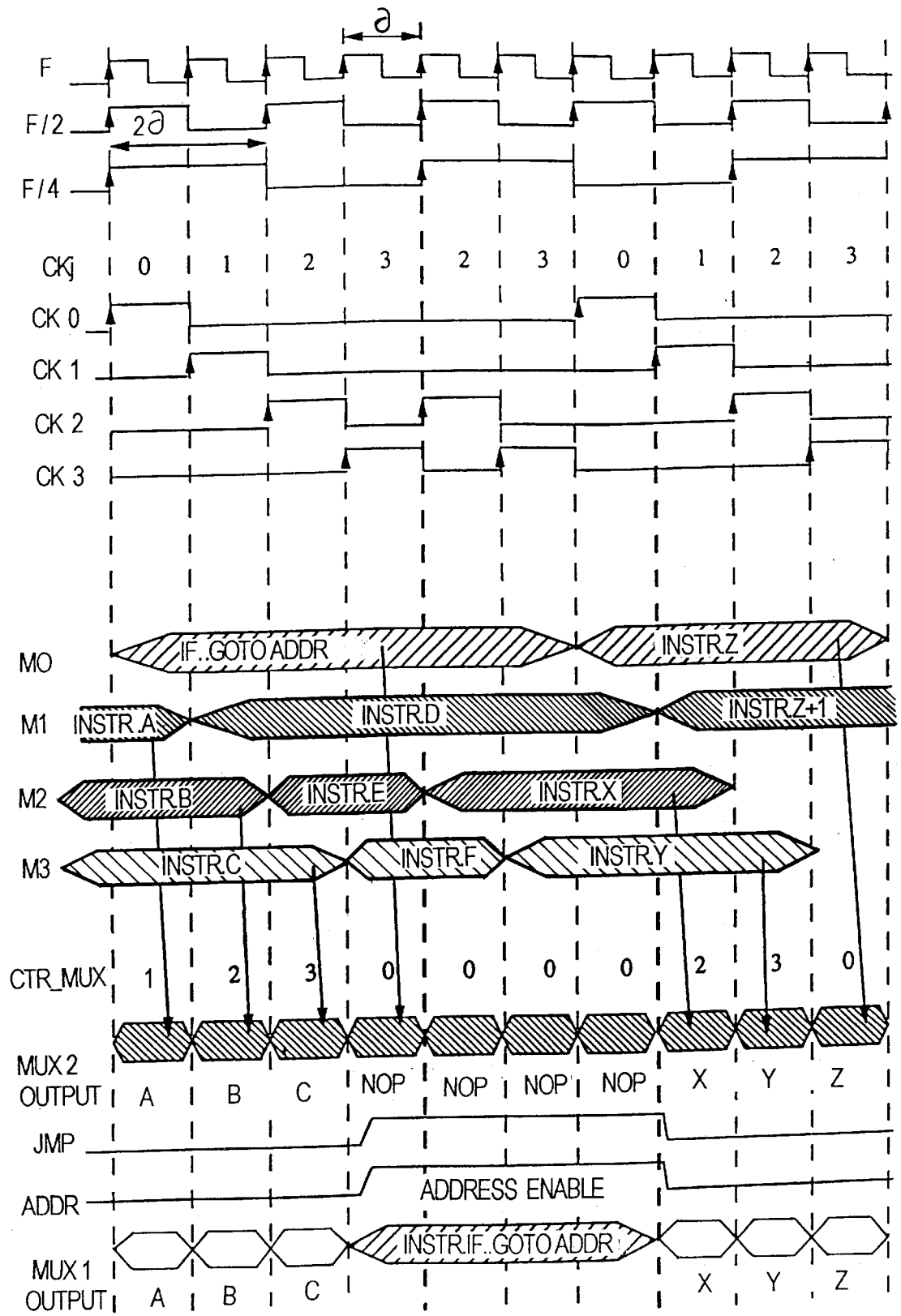
FIG.: 3B

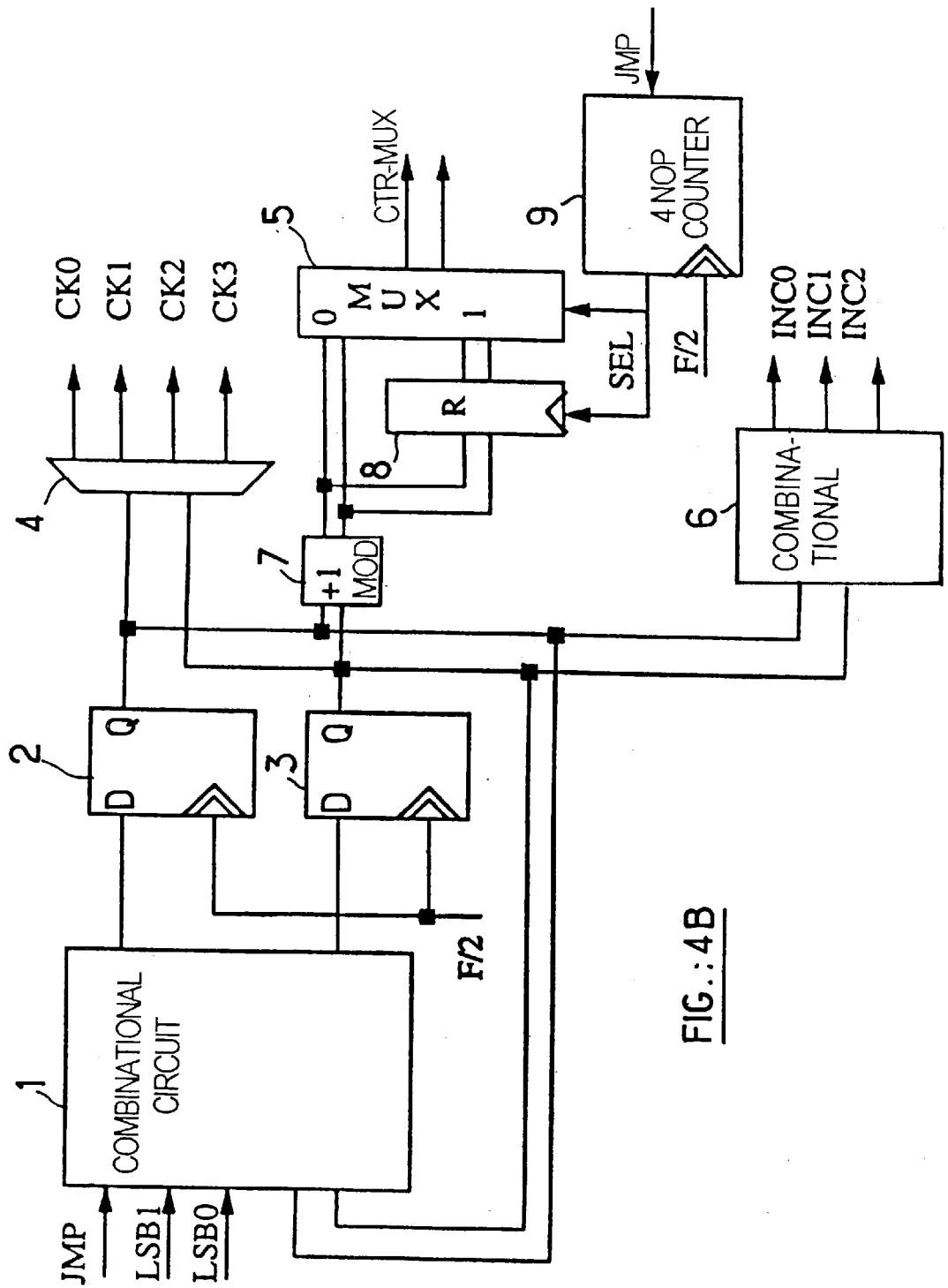
FIG.: 4B

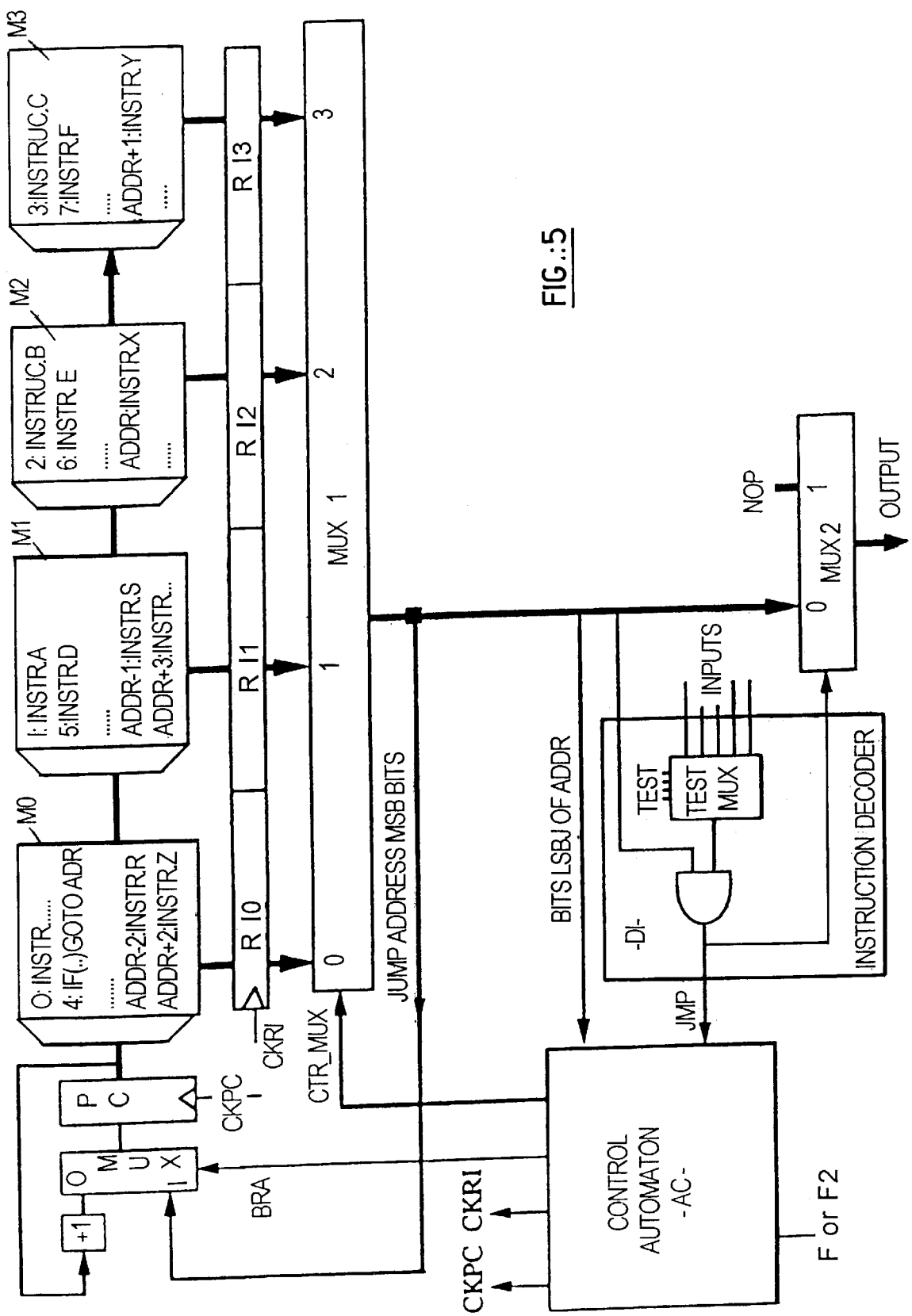
FIG.:5

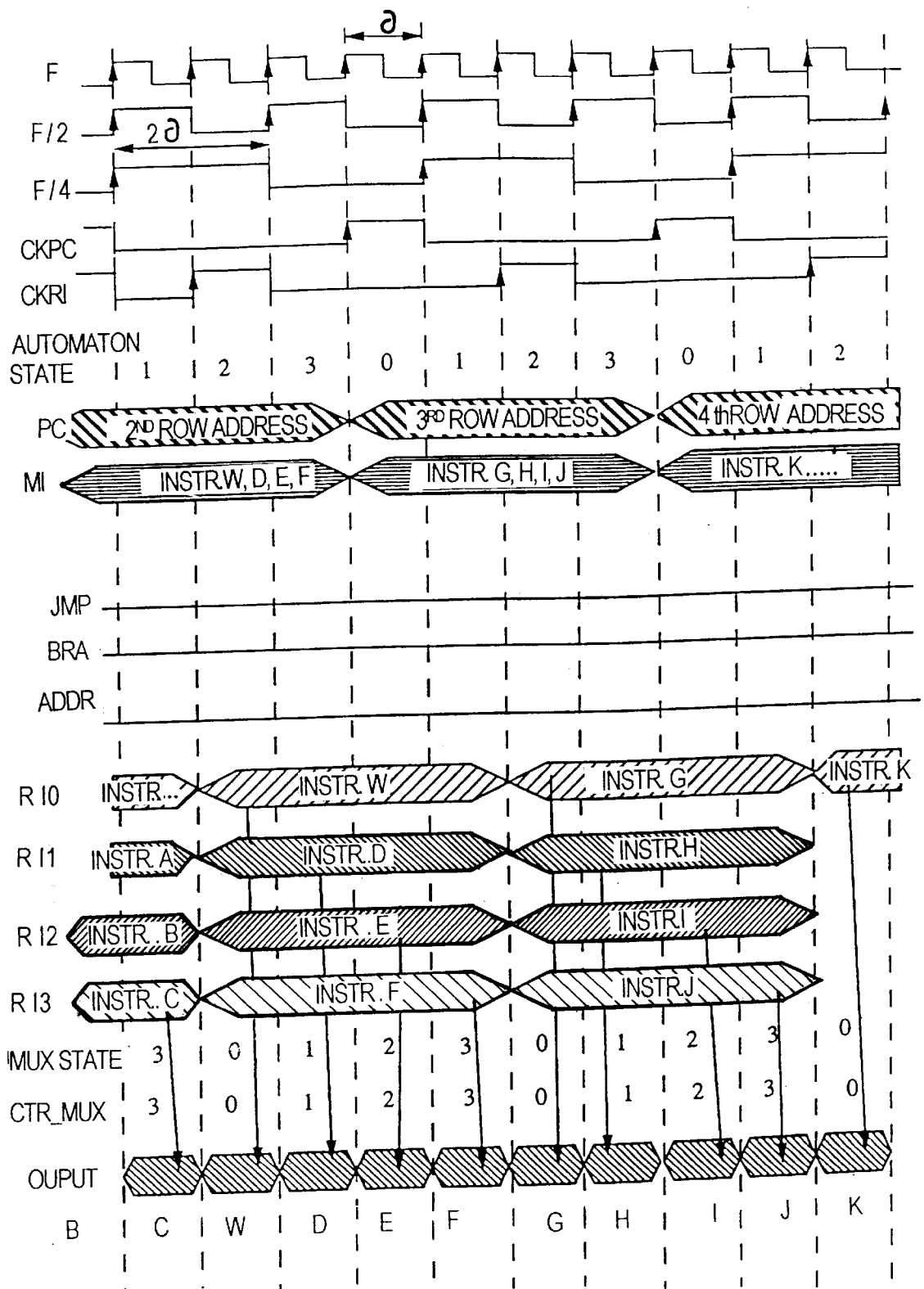
FIG.:6A

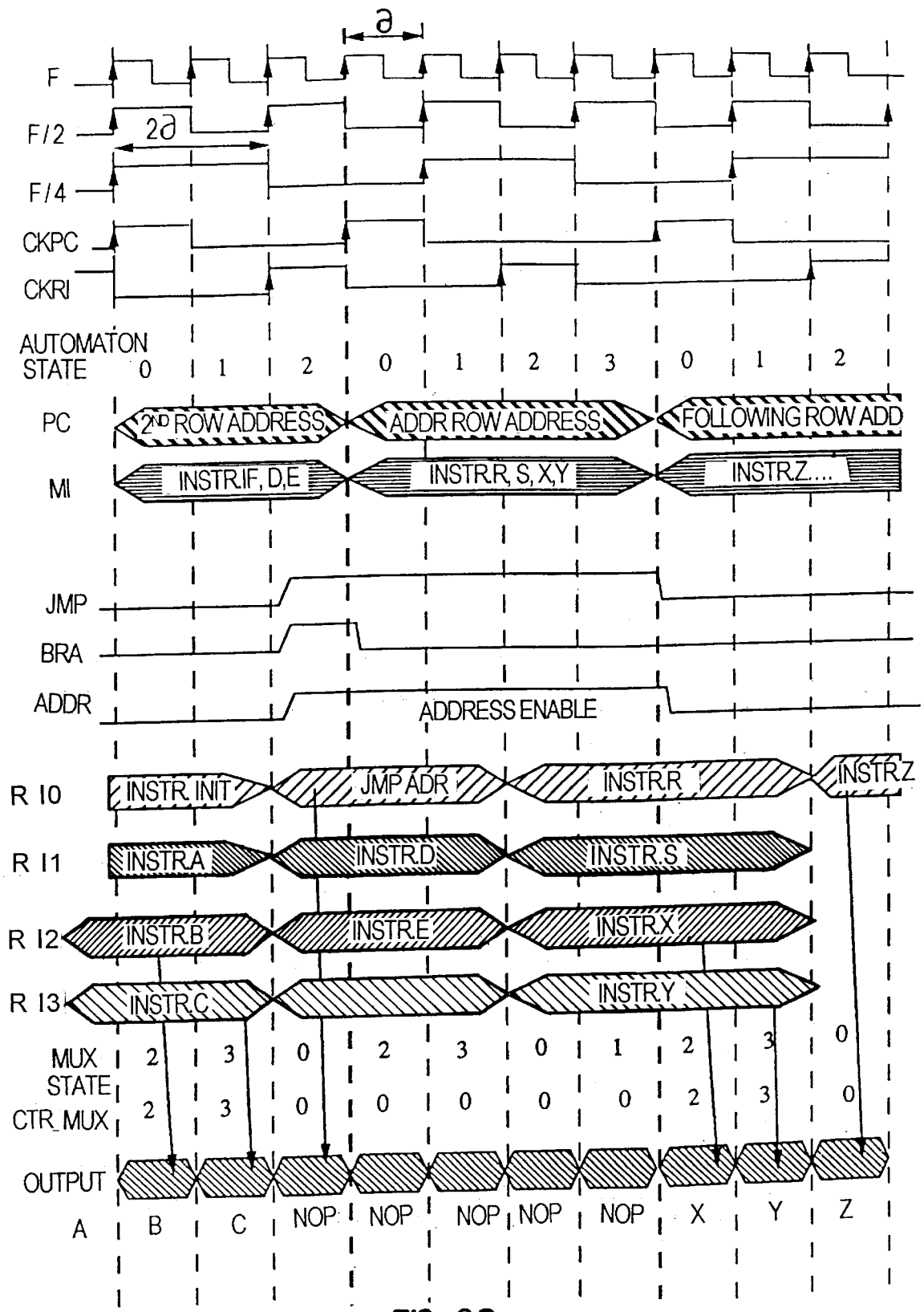
FIG.:6B

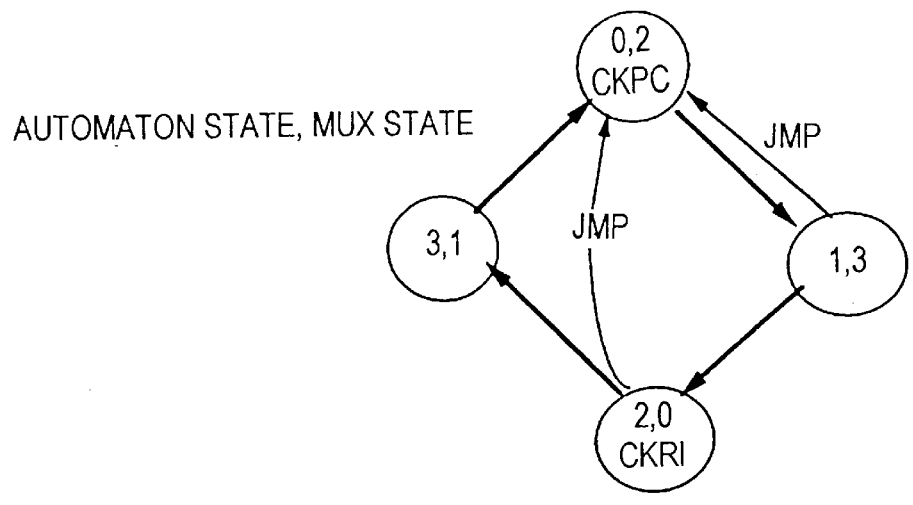
FIG.:7B
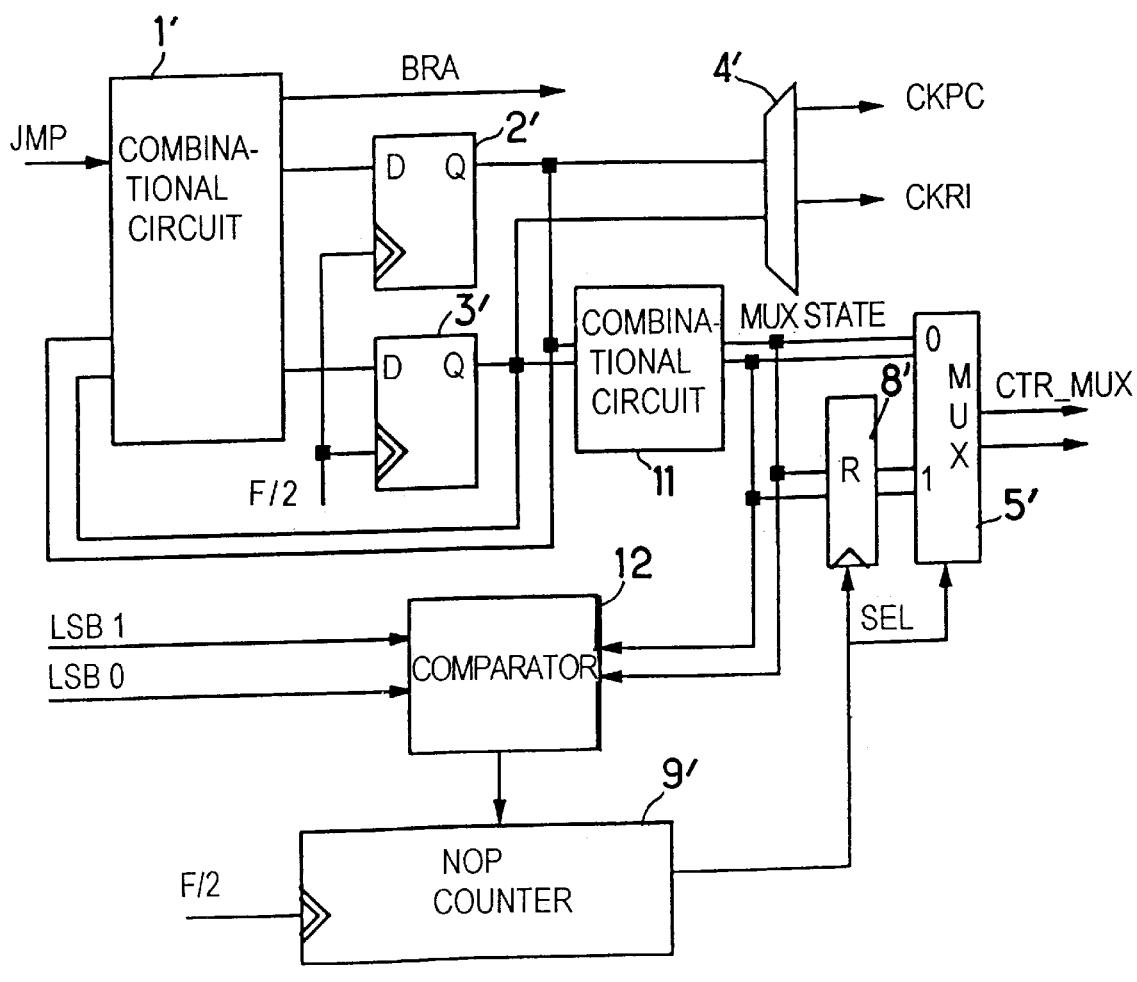
FIG.:7A

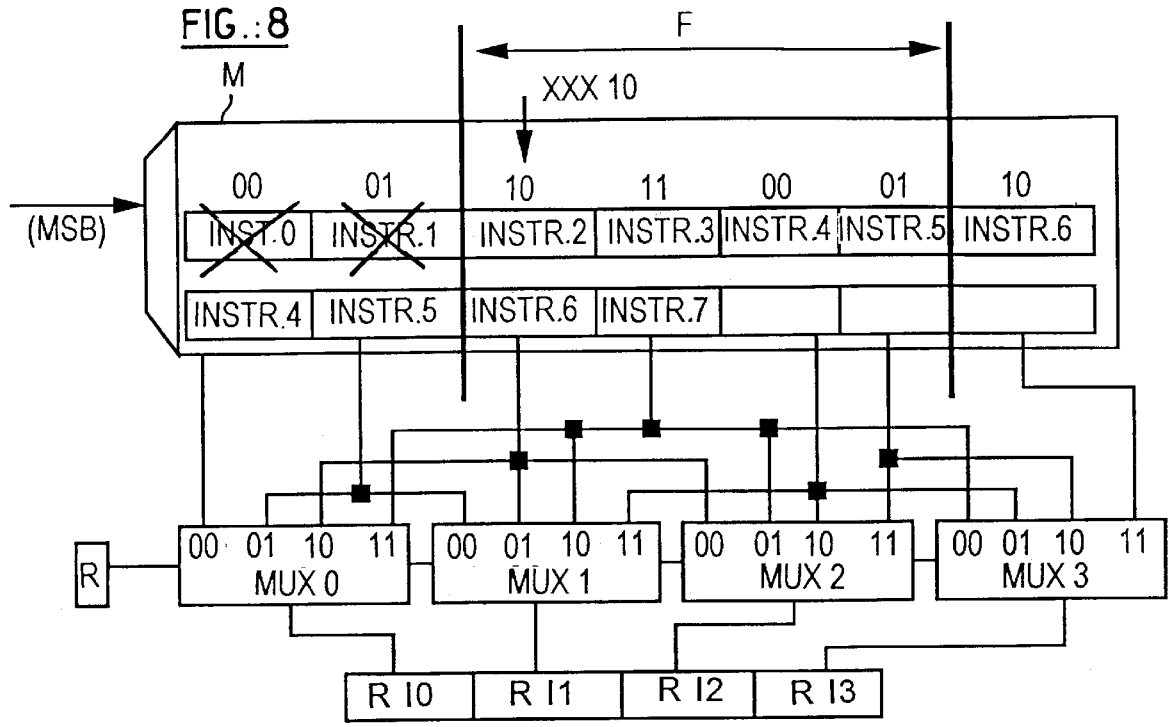
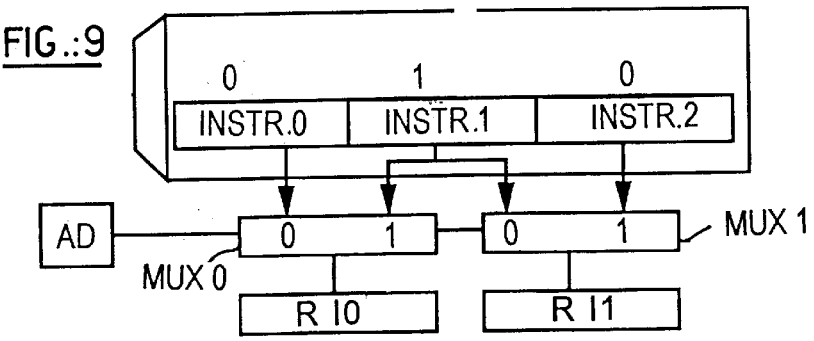
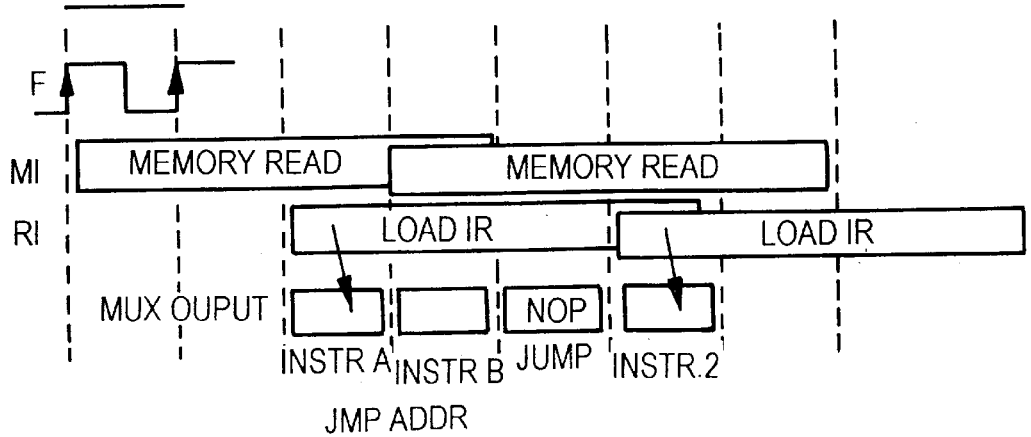

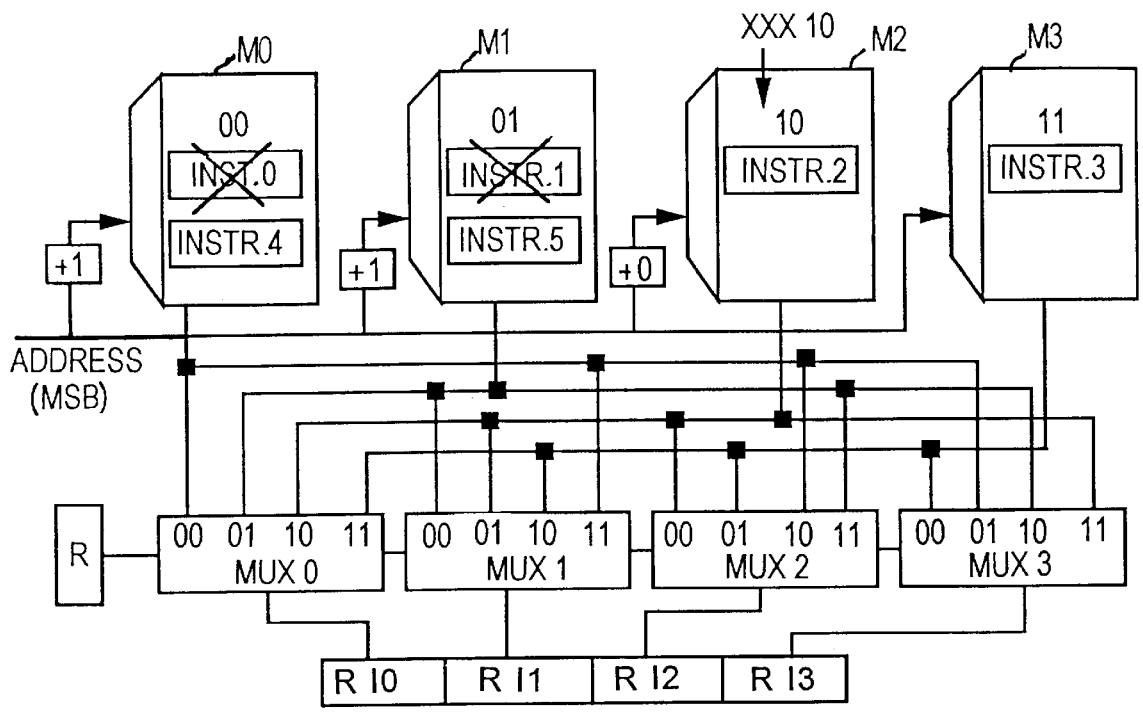
FIG.:10
FIG.:11
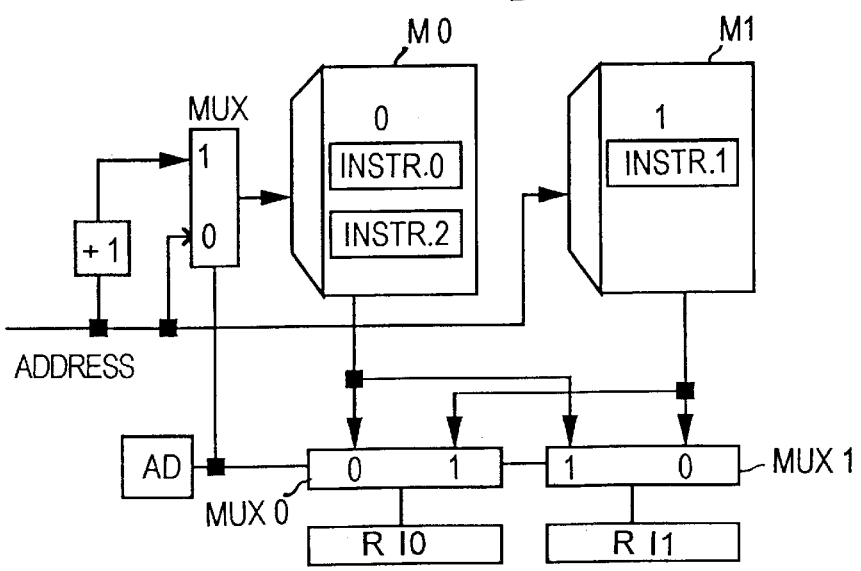

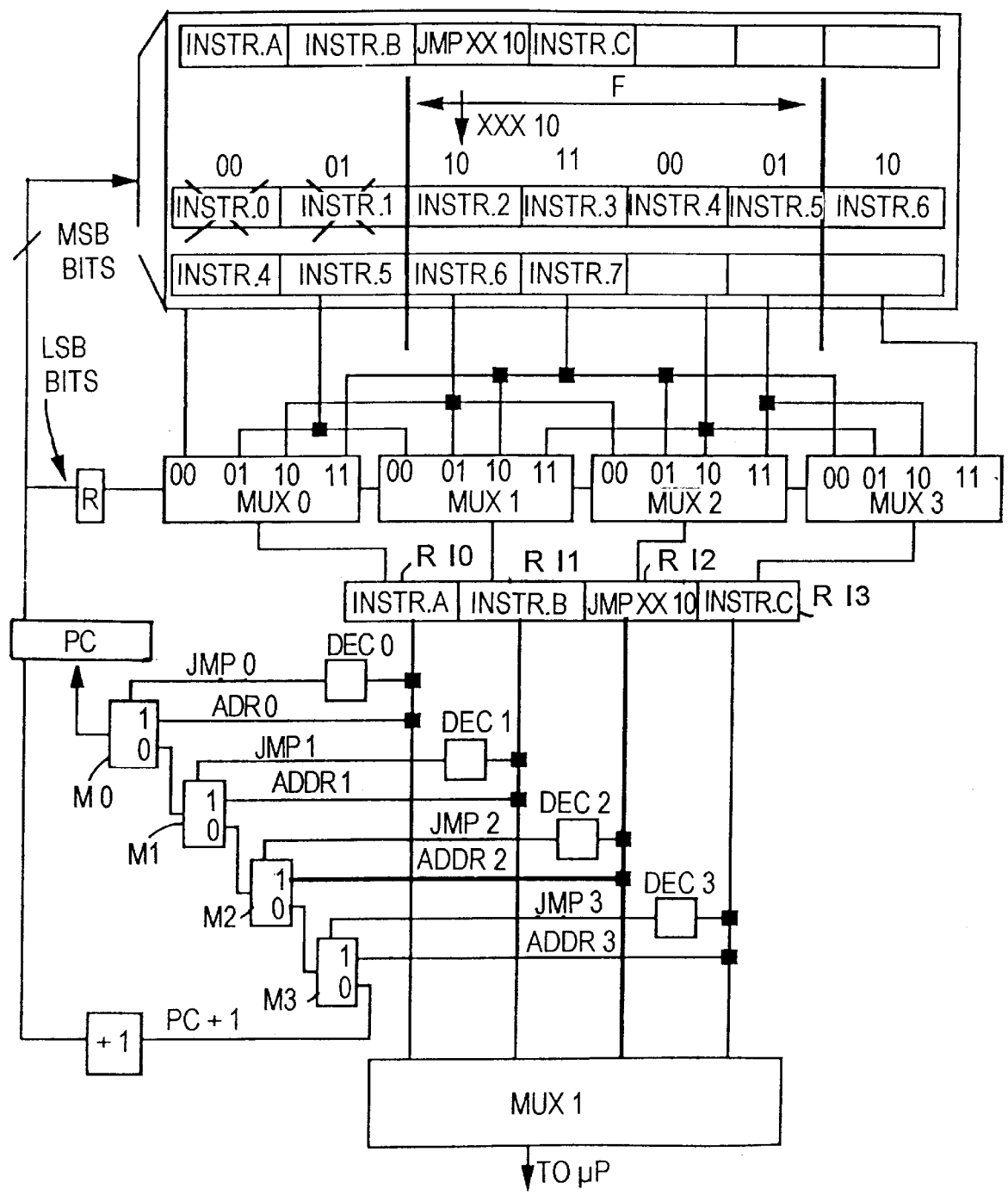
FIG.:12

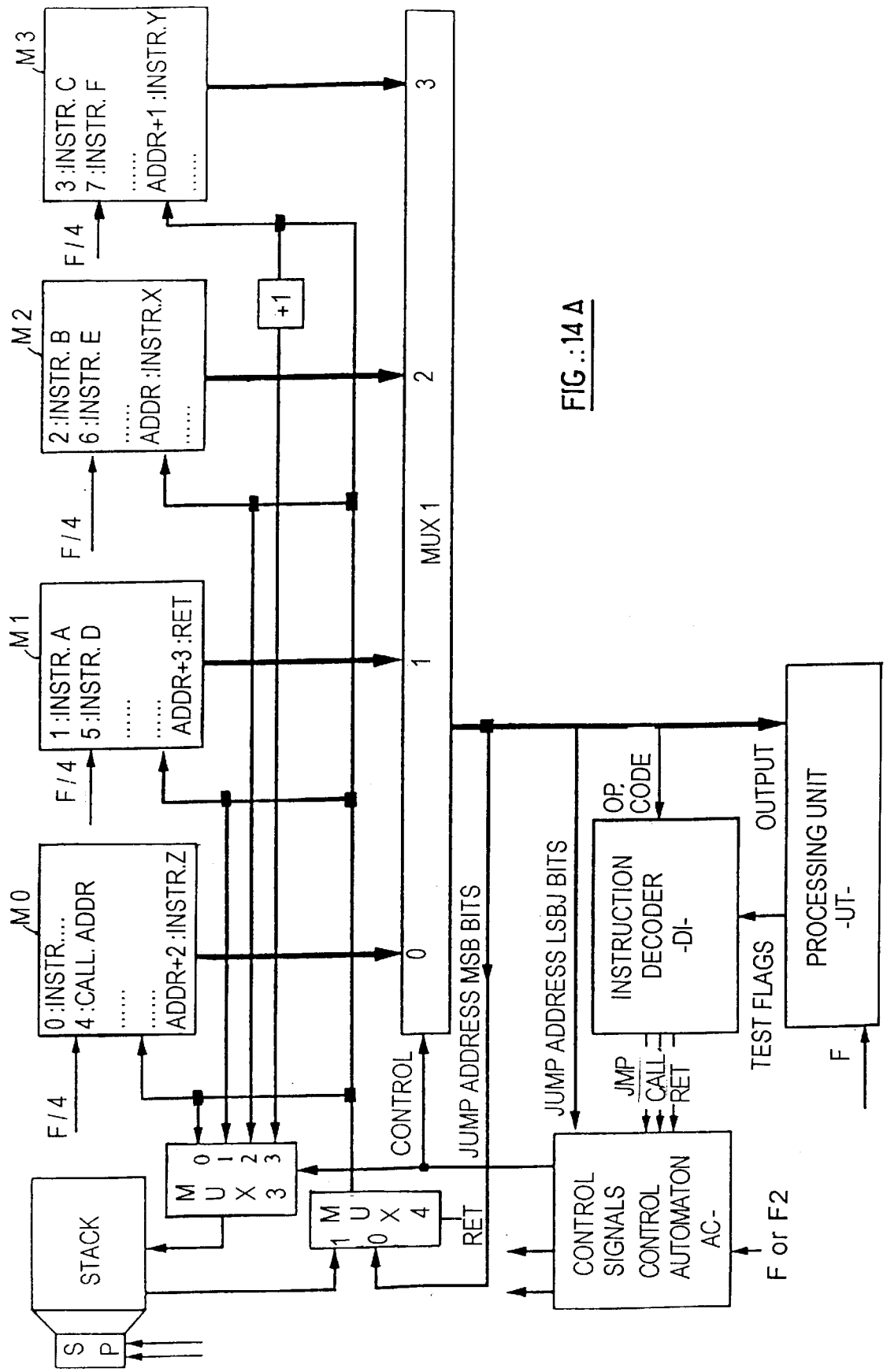
FIG.:14 A

FIG.: 14B
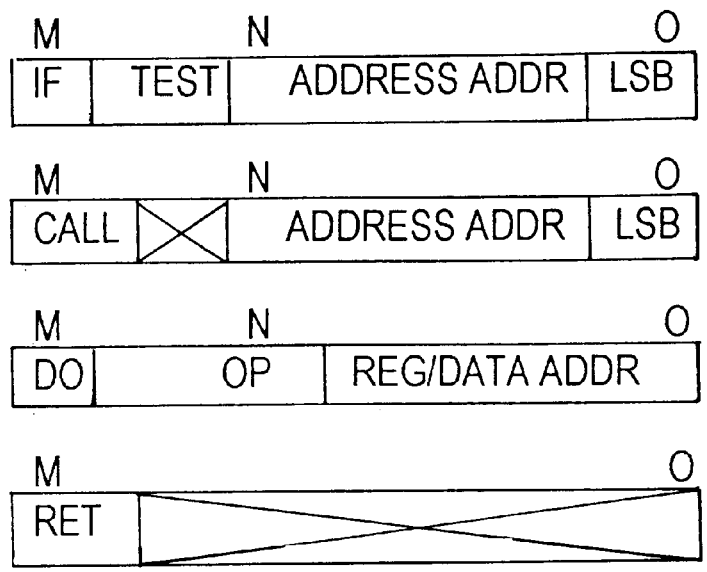
FIG.: 14C
PROGRAM
0 :INSTR......
1 :INSTR. A
2 :INSTR. B
3 :INSTR.C
4 :CALL ADDR
5 :INSTR. D
6 :INSTR. E
.....
.....
ADR :INSTR.X
    :INSTR.Y
    :INSTR.Z
    :RETURN
FIG.:15
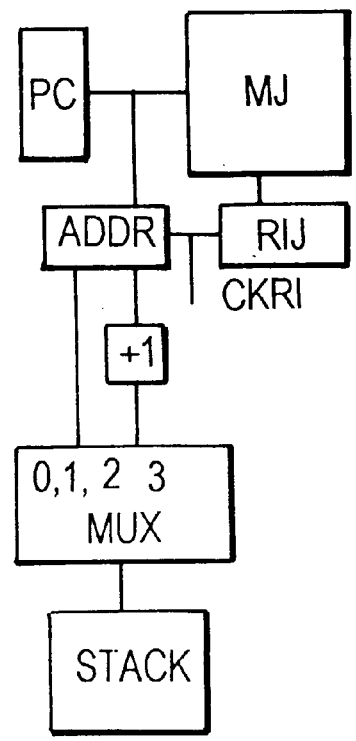

DEVICE FOR EXECUTING A PROGRAM OF INSTRUCTIONS

BACKGROUND OF THE INVENTION

The present invention relates to a device for executing a program of A instructions and, more particularly, to such a device comprising means of storing the A instructions, means of reading m instructions in parallel, a unit for processing these instructions and means for successively supplying the instructions read from the program to the processing unit.

DESCRIPTION OF THE PRIOR ART

Devices making it possible to read m instructions in parallel are particularly useful when either the storage means used are slower than the processing unit, or it is desirable, for reasons of power consumption, to make these storage means work at a frequency lower than that of said processing unit. The storage means may consist either of $N(N \geq m)$ memories in parallel (in which the m instructions are distributed in succession), which are addressed and read practically simultaneously in one memory cycle (time required to read the N memories), or in a single memory each row of which contains N successive instructions, the m instructions being able to be read simultaneously in one memory cycle. It is clear that, with respect to storage means delivering only one instruction per memory cycle, the devices mentioned above can work at a frequency m times lower, which makes it possible to reduce their power consumption accordingly.

For practical reasons, m is often chosen to be equal to $2^n$, and it will be assumed in the rest of the description that such is the case, without in any way being limited to the examples described.

The parallel reading of memory means, among which the instructions of a program are distributed, raises no particular problem when the instructions do not include a jump instruction. In contrast, the management of these means becomes difficult in the opposite case, due to the fact that a jump instruction usually requires a jump to the address of the instruction to be executed (target instruction) which is situated in a memory (or memory area) other than the one which is normally activated after this same jump instruction. With present-day technology, such jumps are accompanied by idle phases slowing the execution of the program.

SUMMARY OF THE INVENTION

The object of the present invention is precisely to produce a device for executing a program of A instructions distributed among several memories or memory areas read in parallel, comprising means suitable for delivering, to an information processing unit, the successive instructions of a program comprising jumps, in an effective way which is able to minimize the number of idle phases observed during the jumps.

These objects of the invention, as well as others which will emerge on reading the description which will follow, are achieved with a device for executing a program of A instructions, comprising first means of storing the program which are able, in one memory cycle, to deliver $2^n$ instructions in parallel, a unit for processing the instructions and second means for supplying successive instructions to the processing unit, wherein said second means comprise a management unit sensitive to a jump instruction belonging to said $2^n$ instructions delivered by said first means, and capable of activating said first means so that the target instruction designated by said jump instruction is the first of the following $2^n$ instructions delivered by said first means.

The n (LSB) least significant bits of the M-bit address of the target instruction identify the memory or the memory area containing this target instruction while the (M-n) most significant bits (MSB) identify one of $2^{M-n}$ rows of $2^n$ addresses each taken from one of the $2^n$ memories. The management unit comprises a control automaton sensitive to the n (LSB) bits of the address of the target instruction in order to address the memory or memories in such a way that this target instruction is the first of the following $2^n$ instructions read.

Thus the control automaton of the device according to the invention provides rapid execution of the instructions during a jump, able to minimize the number of idle phases then observed, as will be seen in what follows. An instruction decoder, sensitive to a jump instruction extracted from a memory supplies the control automaton with a signal indicating that a jump has to be executed.

According to a first embodiment of the device according to the invention, the storage means consist of $2^n$ memories, and a program counter is associated with each memory so as to be loaded with the (M-n) (MSB) bits of an address, the loading of the address being controlled by a clock signal at a frequency of $F/2^n$, where F represents the clock frequency of the processing unit, formed and supplied by the control automaton.

According to a second embodiment of the device according to the invention, a single program counter controls the $2^n$ memories in parallel, this counter being loaded with the (M-n) (MSB) bits of an address by a clock signal at a frequency $F/2^n$ sent by the control automaton, the device further comprising $2^n$ instruction registers each placed at the output of one of the memories and controlled in parallel by a clock signal sent by the control automaton.

According to another embodiment of the device according to the invention, designed for executing programs containing instructions for a call to subroutines and for return to the program, a stack of registers and a stack pointer are provided for the temporary memory storage of addresses of the called subroutines and of the return addresses in the program.

BRIEF DESCRIPTION OF THE DRAWINGS

Other characteristics and advantages of the present invention will emerge on reading the description which will follow and on examining the attached drawing in which:

FIGS. 1A to 1C illustrate the overall organization of the device according to the invention, FIG. 2 is a diagram of a first embodiment of the device according to the invention, FIGS. 3A, 3B are timing diagrams explaining the operation of the device of FIG. 2, FIGS. 4A to 4C represent the structure of a control automaton incorporated in the device of FIG. 2, FIG. 5 is a diagram of a second embodiment of the device according to the invention, FIGS. 6A and 6B are timing diagrams explaining the operation of the device of FIG. 5, FIGS. 7a and 7b represent the structure of a control automaton incorporated in the device of FIG. 5, FIG. 8 represents another variant of the invention according to which a movable window is provided for selecting the $2^n$ instructions, FIG. 9 represents the variant of FIG. 8 in the case in which n is equal to 1, FIG. 10 represents yet another variant of the invention comprising $2^n$ memories and a single program counter, FIG. 11 represents the variant of FIG. 10 in the case in which n is equal to 1, FIG. 12 shows the control means associated with the device of FIG. 8, FIG. 13 is a timing diagram associated with FIG. 12, FIGS. 14A to 14C illustrate an other embodiment of the device according to the invention, and FIG. 15 schematically represents a variant of the device of FIGS. 14A to 14C.

DESCRIPTION OF THE PREFERRED EMBODIMENT

Figure 3A:
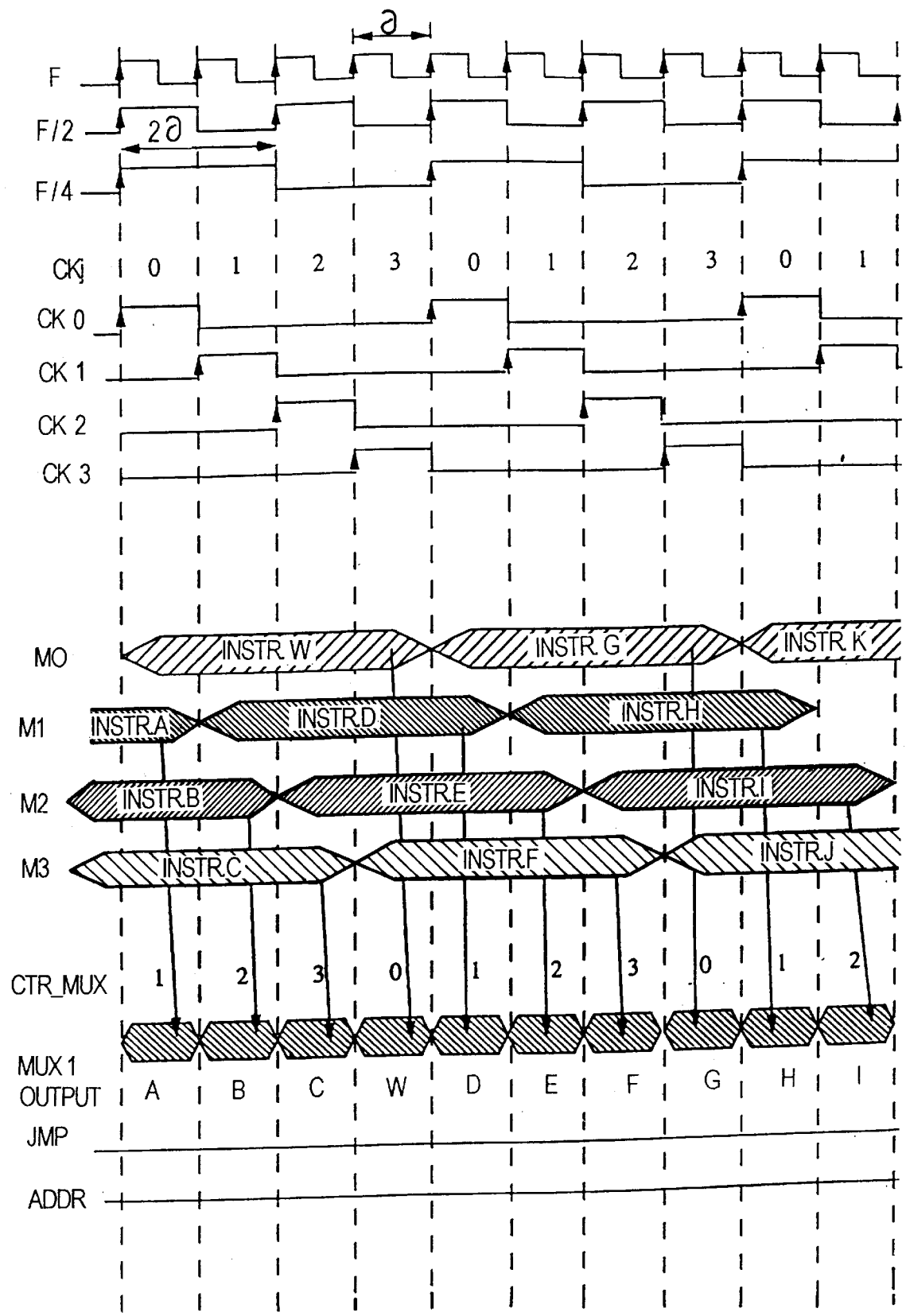

In FIG. 1 it is apparent that the device according to the invention comprises instruction storage means consisting of a plurality of memories Mi (i=0 to 3) among which the A instructions of a program given in FIG. 1C are distributed. The successive instructions of the program are distributed cyclically into the memories M0, M1, M2, M3 as is apparent in FIG. 1. The instruction referenced 4 in the program is a conditional jump instruction: IF ( . . . ) GOTO addr, expressed in a mnemonic language well known to the computer scientist. As represented in FIG. 1A, this instruction, by way of example only, is contained in the memory M0. The format of this instruction is given in FIG. 1B as is that of a current instruction.

By distributing the instructions of the program among $2^n$ memories, it is possible to use a clock or working frequency, for each of them, which is reduced with respect to the frequency F which it would be necessary to use if all the instructions were recorded successively in a single memory. By using four memories (n=2), the working frequency of each of them may thus fall to F/4 which is advantageous as was seen above when these memories have to be powered at low voltage.

By virtue of a multiplexer MUX 1 driven at the frequency F, the instructions of the program are nevertheless supplied to a unit UT for processing these instructions at the frequency F, which allows this unit to operate at this same frequency. The speed of execution of the program is therefore not penalized by the lowering of the working frequency of the memories.

In this context, the object of the present invention is precisely to provide for the execution of a program containing one or more jump instructions, despite the obstacle represented by the distribution of the instructions of the program among several memories or, according to an equivalent arrangement, among several different areas of a single memory.

To this end, the device according to the invention comprises a management unit consisting of an instruction decoder DI and a control automaton AC, the decoder being sensitive to a conditional jump instruction delivered by the output of the multiplexer MUX 1 so as to recognize such an instruction and to supply the control automaton AC with a signal enabling the jump so that the control automaton causes extraction of the instruction located at the address addr given in the jump instruction.

In this way, according to the invention, the M bits of the jump address addr (see FIG. 1B) are divided into n least significant (LSB) bits identifying the memory containing the target instruction at the jump address, and into (M-n) most significant bits (MSB) identifying one of $2^{M-n}$ rows of $2^n$ addresses each taken from one of the $2^n$ memories.

As is apparent in FIG. 1A, these two items of information make it possible to determine, one-to-one, the memory and/or the memory location where the target instruction is to be found, this address being identified by the row (horizontal in FIG. 1A) in which it is located and by the "column" (or memory) which contains it. As is apparent in this figure, the control automaton AC is then fed with the n (LSB) bits of the address in order to activate the memory containing said address and with a signal delivered by the instruction decoder DI, to cause extraction of the instruction located at the address given in the jump instruction.

Referring now to FIG. 2, a more detailed description will be given of the structure and the operation of a first embodiment of the device according to the invention, and, more particularly, of the instruction decoder and of the control automaton incorporated in this device. In FIG. 2 and the following figures, references identical to references already used in the preceding figures identify identical or similar members.

The four (n=2) memories Mi, the multiplexer MUX 1, the instruction decoder DI and the control automaton AC of the device of FIG. 1 can be seen again in FIG. 2. The logic of the decoder consists of a block B for selection of the test variable possibly present in a jump instruction, the output of this block B being combined with the operating code of such an instruction which is present in a gate P which delivers a jump signal JMP, representing validation of the jump condition, to the control automaton. This signal JMP also controls a second multiplexer MUX 2 placed downstream of the first multiplexer MUX 1. In the event of a jump, it is "no operation" NOP codes, inducing idle phases, which are received by the processing unit UT (not represented) connected to the output of the multiplexer MUX 2, instead of and in place of the instructions normally delivered by the multiplexer MUX 1. These NOP codes block the processing unit during execution of a jump.

In order to extract the instruction contained at the jump address indicated in the jump instruction, the control automaton derives clock signals CKj for control of the loading of a plurality of corresponding program counters PCj, and signals INCj for control of the incrementation of these counters PCj. This incrementation is caused by means of two-input multiplexers muj (j=1,2,3,4), one providing normal incrementation of the counter in the absence of a jump instruction while the other is substituted therefore in the event of a jump (presence of the signal JMP), as will be seen later. It will be noted that the signals INCj (j=0, 1, 2) drive multiplexers muxj (j=0, 1, 2) having two inputs one of which is fed with the (M-2) MSB bits of a possible jump address and the other is the preceding address incremented by one unit.

Each of the memories Mi may contain up to A/4 instructions of the program to be executed, with the address instructions j, j+1, j+2 and j+3 respectively in the same row (horizontal in FIG. 2) of the memory positions of the memories M0, M1, M2 and M3. The program counters PCi are loaded, under the control of the signals CKi, with the (M-2) MSB bits of an address, which define the row of instructions containing this address. The two least significant bits LSB allow the control automaton AC to control the multiplexer MUX 1 and thus to select that one of the four instructions of the row which is to be supplied to the processing unit UT.

The timing diagrams of FIGS. 3A and 3B will now be referred to in order to explain the operation of the device of FIG. 2. The timing diagram of FIG. 3A explains the operation of the device in the case of the execution of a program of instructions A, B, C . . . I, J, K etc., devoid of jump instructions. The synchronization clock frequency F, with period δ, and the sub-multiple frequencies F/2 and F/4 have been portrayed, this clock timing the working of the memories Mi, under the control of the clock signals CK0 to CK3, the combination of the logic levels of which corresponds to the values indicated in line CKj. It will be noted that the CKj signals are offset in time with respect to one another and that, consequently, the program counters PCi are not loaded simultaneously.

The access times to the instructions contained in the memories M0 to M3 are also indicated on the lines thus referenced. On the timing diagram of FIG. 3A it is apparent that 3 clock cycles at frequency F are necessary in order to transfer an instruction from a memory into the processing unit (cf "MUX 1 output"), the reading of the instructions from the memories taking place with a shift in time, that of the memory M0 with the clock CK0, that of the memory M1 with CK1, etc.

At the line "MUX 1 output" of the timing diagram of FIG. 3, it is apparent that the multiplexer MUX 1 selects an instruction at the frequency F, the instruction then being decoded by the instruction decoder DI. The instruction is present at the output for the duration δ for feeding the processing unit (not represented). In the case of a low-voltage power supply in particular, as was seen above, it is nevertheless possible to use a combination of signals at a frequency of F/4 to construct the control signal for the output multiplexer.

It will be noted that, in the absence of a jump instruction, incrementing of the program counters PCi in order to move from one row of instructions to the following one takes place conventionally via the incrementation loop connected to the 0 input of the multiplexers mui.

The operation of the device of FIG. 2 will now be explained in the case of the execution of the program represented in FIG. 1C which contains a jump instruction (referenced 4) contained in the memory M0. This instruction: IF ( . . . ) GOTO addr therefore refers back to the jump address addr contained in the memory M2. On the timing diagram of FIG. 3B which illustrates this operation, it is apparent that the decoding of this instruction by the decoder DI takes up four periods δ of the frequency F, for example (cf "MUX 1 output" and M0 lines). As soon as the instruction has been transferred to the output of the multiplexer MUX 1, the decoder causes the processing unit to be fed with "no operation" NOP codes, which block the operation of the processing unit throughout the duration of the execution of the jump indicated in the instruction (cf. "MUX 2 output" line), i.e. 4 periods of the frequency F, for example.

In FIG. 2, it is apparent that the jump indicated in the jump instruction has to be taken into account by the set of program counters PCi, including those which are associated with the memories which do not contain this instruction, so that the jump address can be selected by the multiplexer MUX 1 from the row of instructions which contains it, and so that the following instructions of the row (addr+1, addr+2, addr+3, etc.) can be transferred to the processing unit. It is the control automaton which, on reception of the JMP signal coming from the decoder, forms and then sends the appropriate clock signals CKi and INCi. The control automaton also controls the multiplexer MUX 1 by virtue of the 2 LSB bits which allow selection of the input of the multiplexer which corresponds to the memory containing the jump address.

Hence the control automaton is tasked with the following functions:

determination of the memory which is to be activated first (the memory M2 in the example represented). To do that it uses the least significant bits LSB of the jump address which identify this memory, delivery of the appropriate clock signals to the memories in order to activate the one which is to be activated first. According to one characteristic of the present invention, in the example represented, after the jump instruction to the address addr contained in the memory M2, the control automaton forces a signal CK2, then CK3 (and not CK1 then CK2), so that the memory M2 is activated first, determination of the addresses to be loaded into the program counters associated with the memories. In the example represented, the address addr has to be loaded into the program counters associated with the memories M2 and M3 and the address addr+1 into the program counters associated with the memories M0 and M1, since the instructions Z and following instructions of the program are located at the following row. To do this, the address has to be incremented for all the memories Mi the index i of which is less than j, Mj being the memory which is to be activated first, generation of the signal ctr_Mux which controls the multiplexer MUX 1 so that the jump instruction remains available over four δ periods and can supply the jump address to the four program counters, which load this address at different times, and production of four "no operation" NOP codes in order to ensure blocking of the processing unit during execution of the jump instruction.

An embodiment of the control automaton making it possible to execute the functions set out above, has been represented in FIG. 4B. As is apparent in FIG. 4B, this automaton is fed with the jump signal JMP supplied by the instruction decoder Di and with the two least significant bits LSB 1 and LSB 0 of the jump address so as to derive and deliver the clock signals CKi for activating the memories Mi, the incrementation signals INC0, INC1, INC2 and the multiplexer MUX 1 control signal. To do this, the automaton comprises a first combinational circuit 1 fed with the signals JMP, LSB 1, LSB 0 and driving the D inputs of two dual-edge flip-flops 2 and 3, the Q outputs of which feed a decoder 4 delivering the signals CKi, a multiplexer 5 via a modulo N incrementer (N=4 in the example illustrated) and a second combitional circuit 6 delivering the signals INC0, INC1 and INC2. The Q outputs of the flip-flops are also looped back onto the input of the combinational circuit 1, due to the sequential nature of the latter, as will be seen later.

FIG. 4A represents a state diagram employed by the combinational circuit 1 for delivering signals CKi. FIG. 4C is a truth table employed by the combinational circuit 6 for delivering the signals INC0, INC1 and INC2 depending on the decimal value 0, 1, 2 or 3 represented by the four possible states of the pair of Q outputs of the two flip-flops 2 and 3. The production of the combinational circuits 1 and 6 from the information contained in FIGS. 4A and 4C is within the scope of the everyday activities of the person skilled in the art with a knowledge of combinational logic and the commercially available circuits designed to implement it.

As is apparent in FIG. 4B, the clock inputs of the flip-flops are activated at the frequency F/2, the flip-flops being dual-edged. With normal flip-flops, the frequency F would be used.

It will now be explained how the assembly consisting of the combinational circuit 1, the flip-flops 2 and 3 and the decoder 4 makes it possible to control sending of the signal CKi for activation of the next memory which is to be activated, or to "reactivate", first. On the state diagram of FIG. 4A, the arrows in bold line correspond to the execution of a program without jumps (JMP=0), the others to a jump (JMP=1). The triplets of binary values associated with each arrow correspond to JMP*LSB1 *LSB 0, the latter two then designating the memory to be made to reactivate first. Thus, it is apparent that, in the absence of a branch instruction, the order for activation of the memories Mi repetitively follows the cycle M0, M1, M2, M3, M0 etc. In the presence of a jump instruction, (MP=1) it is the bits LSB 1 and LSB 0 of the jump address which determine the next memory to be activated. Thus, for example, if LSB 1=1 and LSB0=0, whereas the last memory activated is the memory M3 (CK 3=1), the code 10 (=2 in decimal) associated with the set of bits LSB 1 and LSB 0 designates the memory M2, and it is the signal CK 2 which is sent out by the decoder 4.

Control of the multiplexer MUX 1 is based on the "state" of the control automaton corresponding to the set of states of the two Q outputs of the flip-flops 2 and 3. In FIG. 3B, it is apparent that the command Ctr-Mux, corresponds to the state CKj of the automaton, incremented by one unit modulo N, giving rise to the presence of the modulo 4 incrementer 7 of FIG. 4B on these Q outputs. As was seen above, in the case of conditional jump instructions, the output of the multiplexer MUX 2 (FIG. 2) has to be blocked by NOP codes during reading of the jump instruction, i.e. over four periods of the working frequency F. Control of the multiplexer 5 is then blocked in a register 8 on sending of the JMP signal, by virtue of a 4-NOP counter referenced 9 in FIG. 4B, driven at the frequency F/2. In FIG. 3B, it is apparent that this blocking takes place upon code 0. At the end of the four periods, the counter deactivates a blocking signal SEL. The multiplexer then selects another instruction and the JMP signal becomes inactive (JMP=0).

The truth table of FIG. 4C gives the values of the incrementation signals INC0, INC1 and INC2 for the program counters associated with the memories M0, M1 and M2, for each "state" of the control automaton. In the event of a jump instruction, the rest of the instructions to be read resumes (in the example illustrated in FIG. 3B) from those containing the jump address addr contained in the memory M2. Thus it is necessary next to read the instruction contained in the memory M3, without incrementing the program counter associated with this memory, then in the memories M0 and M1, at the following row, which are addressed by the program counters PC0 and PC1 which therefore have to be incremented. As was seen above, Mj being the memory which has to reactivate first, incrementation applies to the memories Mi, the index of which i<j. The truth table of FIG. 4C implements this rule. In practice (see FIG. 2), the incrementations thus determined are carried out by incrementers ("+1" blocks) and multiplexers mux 0, mux 1, mux 2 driven by the signals INC0, INC1, INC2.

In FIG. 5 a second embodiment of the device according to the invention has been represented schematically, which is distinguished essentially from that of FIGS. 2 to 4 in that a single program counter PC simultaneously addresses all the memories M0 to M3. In this second embodiment, the instruction decoder DI and the multiplexers MUX 1 and MUX 2 of the embodiment of FIG. 2 are again found. It further comprises a control automaton AC which is distinguished from that of FIG. 4 and which will be described in more detail in connection with FIGS. 7A and 7B. This control automaton controls the program counter PC (CKPC signal), the latter being loaded through a multiplexer mux which is itself controlled by an unconditional jump signal BRA also supplied by the control automaton. The multiplexer has two inputs, one of them providing for the possible input of a jump address and the other being connected to an incrementation loop ("+1" block). In the absence of a jump instruction, the 0 input of the multiplexer mux fed by this loop is active. In the presence of a jump command (BRA=1), the other input is activated.

The device of FIG. 5, in accordance with a characteristic specific to this embodiment of the invention, further comprises a set of registers RIO to R13 at the output of the memories M0 to M3 respectively, controlled in parallel by a clock signal CKRI coming from the control automaton, these registers receiving the instructions present in the various rows of the memories M0 to M3.

The timing diagrams of FIGS. 6A and 6B will now be referred to in order to describe the operation of the device in the absence of jump instructions (FIG. 6A) and in the presence of such an instruction (FIG. 6B). These timing diagrams are organized in essence like those of FIG. 3A and FIG. 3B, with the difference that there is no more than one single clock signal CKPC instead of four (CK0 to CK3) and that the access times to the instructions in the register Rli replace the access times to the instructions in memory M0 to M3.

In FIGS. 6A and 6B, it is apparent that the instructions are loaded into the registers Rli after two periods of the frequency F. They can also be loaded after three or four periods of F in order to give more time for reading the memories. By thus increasing the read time, however, the number of NOP codes to be sent upon a jump is also increased, as will be seen later in connection with FIG. 6B.

Reading of the instructions in memory takes place simultaneously for all the memories M0 to M3. Two periods of F later, these instructions are loaded at the same time into the registers Rli. It is then that control of the output multiplexer MUX 1 makes it possible to select the instructions one after the other so as to send them to the output of the multiplexer MUX 1 and, from there, into the processing unit (not represented), via the multiplexer MUX 2.

The execution of the program with a jump of FIG. 1C by the device of FIG. 5 will now be described with the aid of the timing diagram of FIG. 6B and of the diagram of the control automaton represented in FIG. 7A.

Upon the passage of a conditional jump instruction to the output of the multiplexer MUX 1, it is decoded by the decoder DI which then supplies a jump signal JMP=1 to the control automaton. The jump is then provided for by loading the jump address into the single program counter PC. The control automaton AC supplies the signals necessary for managing the jump.

This automaton has several functions:

delivery of the appropriate clock signals to the program counter PC and to the instruction registers Rli in order to load the jump address as soon as possible, despite the disruption in sequencing which is then observed. In FIG. 6B, it is apparent that, after decoding of the jump instruction JMP, the automaton immediately forces a signal CKPC then a signal CKRI, determination of the memory which is to reactivate first (in the example given, it is the memory M2 which contains the jump address addr). To do that, as in the preceding embodiment, the least significant bits LSBj of the jump address are used, which identifies the memory which is to reactivate first. It is also necessary to determine the instant of this reactivation. This requires a comparison between the bits LSBj and the control bits of the multiplexer, as will be explained in what follows in connection with FIG. 7, blocking of the control signals (Ctr_Mux) of the multiplexer MUX 1 so that the intermediate instructions of the program, between a jump instruction and the target instruction placed at the jump address addr in the memory which is to restart first, are not executed and that the NOP codes are produced as output.

A possible structure of the control automaton, making it possible to execute all these functions, has been represented in FIG. 7A. Certain elements of the control automaton of FIG. 5 are again found in this automaton, particularly a combinational circuit 1' feeding the D inputs of two dual-edge flip-flops 2' and 3' driven at the clock frequency F/2, the Q outputs of these flip-flops constituting the "state of the automaton" which allows a decoder 4' to form the clock signals CKPC and CKRI. The automaton comprises a second combinational circuit 11 sensitive to this "state of the automaton" so as to supply, as output, a "state of the multiplexer" Mux State feeding a 0 input of a multiplexer 5' delivering the signal Ctr_Mux for control of the multiplexer MUX 1 of FIG. 5.

The control automaton again comprises a comparator 12 of the bits LSB 1 and LSB 0 on the one hand and of the state of the multiplexer on the other hand, in order to control a NOP counter 9' driven at the frequency F/2. The output SEL of the counter, at the appropriate time, triggers the feeding of the input 1 of the multiplexer 5' with the state temporarily placed in memory in a register 8'.

FIG. 7B represents a state diagram used by the combinational circuit 1', the flip-flops 2', 3' and the decoder 4'. The thick arrows indicate the changes in the state of the control automaton (the Q outputs of the flip-flops) and in the state of the multiplexer (the output of the combitional circuit 11) in the absence of jump instructions JMP=0), while the other arrows indicate these changes in the presence of jump instructions JMP=1).

As soon as a jump is decoded by the decoder DI, the combitional circuit 1' activates the signal BRA for control of the multiplexer mux of addresses of the program counter PC. The signal then comes back to 0 (see BRA line, FIG. 6B) for loading the jump address into the program counter PC.

The command Ctr_Mux of the multiplexer MUX 1 is based on the state of the automaton. In FIG. 6B, it is apparent that the command Ctr_Mux corresponds to the state of the automaton increased by 2 (modulo 4). This results from the fact that the shift between reading the instructions and loading into the registers Rli is 2 periods of the working frequency F. The combitional circuit 11 carries out this operation.

In order to block the control of the output multiplexer, the Mux State command is stored in memory in the register 8 upon activation of the signal SEL. The counter 9' synchronized to the frequency F/2 (in the case of the use of dual-edge flip-flops) starts up upon activation of the JMP signal and counts the periods during which the output multiplexer should be blocked (at code 0 in the example of FIG. 6B). In this figure, it is apparent that 5 consecutive NOP codes are necessary before the instruction X figuring in the jump address addr passes to the output of the multiplexer MUX 1.

The counter 9' deactivates the SEL signal when the comparator 12' indicates that the executed instruction (the instruction X) is in its execution phase. To do this, the comparator compares the LSB bits of the jump address, indicating which memory should start up first (in this example, the memory M2 containing the instruction X) with the command for the output multiplexer (Mux State=2, FIG. 6B). The multiplexer then selects the instruction X and the signal JMP comes back to the inactive state, i.e. JMP=0.

FIG. 8 shows a memory M, the rows of which include $N=(2 \times 2^n)-1$ instructions, which is capable of delivering $2^n$ instructions in parallel. In the case represented, n is equal to 2 and N is equal to 7. In order to select the $2^n$ instructions to be written into the registers R10 to R13, four four-input multiplexer Mux0 to Mux3 are used. The inputs of the first multiplexer Mux0 are connected to the first four positions of the memory row addressed, the inputs of the second multiplexer Mux1 are connected to positions 2 to 5, the inputs of the third multiplexer Mux2 are connected to positions 3 to 6, etc. According to the value of the code recorded in the control register R (the code consists of the LSB bits of the address of the first of the $2^n$ instructions), it is possible to select the first $2^n$ instructions from a row or the instructions at positions 2 to $2^n+1$ or those at positions 3 to $2^n+2$, etc. It will be noted that alteration of the control code of the multiplexers amounts to shifting a window F (shown symbolically by two thick lines) in which the instructions to be selected are found. If, moreover, the instructions are written into the memory in such a way that each row contains $(2 \times 2^n)-1$ successive instructions and that the first $2^n-1$ instructions of a row are identical to the last instructions of the preceding row, the program of instructions is always accessible in the window whatever the position of this window. In the case of a jump, the LSB bits of the jump address (address of the target instruction) are loaded into the control register, which has the effect of shifting the window in such a way that the target instruction is the first of the $2^n$ (four in the example considered) instructions selected. FIG. 8 represents the case of a jump to the address xxx10 (xxx representing the number of the memory row and 10 representing the number of the memory area in this row). The code 10 is loaded into the control register, having the effect of positioning the window over positions 10 to 01 of the memory. The MSB bits (i.e. xxx) of the jump address serve to address the desired row of the memory. It will be noted that, in the case represented, the instructions referenced 0 and 1 at positions 00 and 01 should not be executed and are not selected.

FIG. 9 shows an example of the device of FIG. 8 when n is equal to 1. The memory comprises three instructions per row and the window covers only two instructions per row. Two multiplexers Mux0 and Mux1 only, controlled by the code AD, are necessary to shift this window over the first two or the last two positions of the memory rows. After a jump to an even (xxx0) or odd (xxx1) address, AD=0 or 1, respectively.

FIG. 10 shows another example of memory storage means capable of being used in the context of the present invention. These means comprise $2^n$ (with n equal to 2) separate memories $M_0$ to $M_3$ and a single program counter (not represented). As in the preceding example, four four-input multiplexers Muxi (i=0 to 3), controlled by a code loaded into a control register R, allow selection of four successive instructions. Upon a jump (at address xxx10 in the case represented), the multiplexers Muxi are driven in such a way that the instruction at address xxx10 is selected by the first multiplexer Mux0, the other multiplexers selecting the following instructions. As the address instruction xxx10 is in the third memory $M_2$, the third and fourth instructions are at the following row of the first and second memories. In order to be able to select this following row, there is provision for placing "+1" incrementers between the program counter and the address decoder (not represented) of each memory (except the last one). These incrementers are activated in relation to the content of the control register R. As previously, the control register is loaded with the LSB bits of the jump address.

FIG. 11 shows the device of FIG. 10 in the case where n is equal to 1.

FIG. 12 shows an example of a mechanism for managing jumps with anticipation. Although the upper part of this figure is identical to FIG. 8, it should nevertheless be understood that the device of FIG. 10 can also be used instead and in place of that of FIG. 8. In the example represented, a jump instruction (jmp xx10) appears in the third register R12. The code for this instruction is decoded by the decoder dec2 which, with the aid of the signal jmp2, drives the address multiplexer m2 which is associated with it so that the latter transmits the jump address addr2 to the program counter PC of the memory. The arrangement of the address multiplexers mi is such that a jump instruction in the first positions of the registers R10 to R13 will have priority with respect to an instruction in a more remote position. If the registers R10 to R13 do not contain a jump instruction, the address contained in the program counter will be incremented by one unit with the aid of the "+1" incrementer.

FIG. 13 is a timing diagram which shows how the instructions are read and executed in the case of a jump instruction situated in the third position. The presence of this jump instruction is detected and has the effect of immediately initiating reading of the memory commencing at the jump address. Thus, an instruction A, an instruction B, the jump instruction (jmp) and the target instruction (instr. 2) are successively executed. It will be noted that the reading of the instructions following the jump instruction occurs during the execution of instruction B.

A third embodiment of the device according to the invention, designed for executing a program (see FIG. 14C) including instructions for calling subroutines (code: CALL) and for return (code: RET) to the main program from the subroutine, has been represented schematically in FIG. 14A. These call and return instructions constitute particular cases of the jump instructions. The formats of these instructions are given in FIG. 14B.

The device, like the preceding ones, comprises memories M0 to M3, a multiplexer MUX 1, an instruction decoder DI and a control automaton AC and delivers the instructions of the program to a unit UT for processing these instructions. According to the invention, the device further comprises a register stack, of the LIFO type for example, and a stack pointer SP, which are conventional, for storing temporary addresses when passing to a subroutine of instructions X, Y, Z such as that represented in FIG. 14C.

The mechanism for executing an instruction for calling a subroutine is similar to that for a jump instruction. The only difference concerns the memory storage of the start address, that is to say the current address contained in the program counter (the case of a device with a single program counter), or in one of the program counters (the case of a device with several program counters).

In the case of a device numbering several program counters, of the type of that of FIG. 2 for example, control of the output multiplexer also controls a multiplexer MUX 3 routing the return address in the memory which contains the CALL code. In the example of FIG. 14A, the current address of the program counter (not represented) of the memory M0 is routed, since the call code CALL is in this memory. When this code is decoded by the decoder DI, the program counter of the memory M0 is no longer altered.

In the case of a device with a single program counter PC, as shown schematically in FIG. 15, the address contained in the program counter is stored in memory in a register ADDR loaded with the clock signal CKRI. This address is therefore available throughout the whole duration of execution of the $2^n$ instructions contained in the registers Rli and can therefore be loaded into the stack if one of the $2^n$ instructions is a return instruction.

For executing a return instruction (code: RET), the same jump mechanism is applied taking the return address, however, from the stack, by virtue of appropriate command to a multiplexer MUX 4 (see FIG. 14), controlled by the code RET.

It is now apparent that the present invention makes it possible to achieve the stated aim, namely executing a program of instructions with jumps, which is distributed among several memories driven at a frequency less than the overall working frequency of the device, that is to say with memories supplied with power at lower voltage. The additional cost entailed by the use of a plurality of program memories is small, the size of each being able to be reduced in proportion to their number.

The present invention finds an application in particular in the control device widely known as "controler" or to store the application program of a microprocessor carrying out processing of instructions in "pipeline" (overlap) mode for example.

Obviously the invention is not limited to the embodiments described and represented which have been given merely by way of example. Thus, the management of the jumps can be simplified by permitting only certain possibilities for jumps. For example, the jump instructions could be permitted only in a restricted number of memories, (for example in a single memory). The insertion of NOP codes or a rearrangement of the program makes it possible to get round this constraint. Likewise, the jump addresses could be possible only in a restricted number of memories, for example one only. The programmer could also be constrained, in the event of a jump in a memory, to insert $2^n$ jump instructions afterwards. The jumps could be permitted only to addresses contained in the same memory. The instruction preceding a jump in the program could be placed in the code executed after the jump, blocking the output multiplexer a little later, in order to reduce the number of NOP codes. All these constraints could be imposed separately or in combination.

According to another variant, the instruction set which is available for the programmer comprises the conditional jump instruction: IF ( . . . ) SKIP next instruction. This instruction makes it possible to avoid a jump by substituting an NOP code for the following instruction. With the device of FIG. 5, if the jump has to take place to an instruction already placed in one of the $2^n$ registers Rli, it is possible simply to use the LSB bits of the address in order to determine control of the output multiplexer which provides for the output of this instruction, which makes it possible to limit the number of NOP codes sent, and thus to keep up the speed of processing of the instructions of the program.

It will be noted that the device of the invention can advantageously be used in association with a "cache" memory of a microprocessor. These "cache" memories are rapid-access memories, generally forming part of the same integrated circuit as the microprocessor and containing instructions loaded from a main memory of larger capacity and slower of access, placed outside the circuit. By judicious management of the exchanges between the main memory and the "cache" memory, it is possible to load the latter with the most often used instructions. The microprocessor is then hardly penalized by the long access time of the main memory.

We claim:

1. A device for executing a program of A instructions, comprising first means including $2^n$ memories for storing the program which are able, in one memory cycle, to deliver $2^n$ instructions in parallel, a unit for processing the instructions, said processing unit operating at a clock frequency F, and second means for supplying successive instructions to the processing unit, wherein said second means comprise a management unit sensitive to a jump instruction belonging to said $2^n$ instructions delivered by said first means, and capable of activating said first means so that the target instruction designated by said jump instruction is the first of the following $2^n$ instructions delivered by said first means, said processing unit being capable of processing $2^n$ instructions in one memory cycle, said $2^n$ memories each operating at a clock frequency lower than that of said processing unit.

2. The device as claimed in claim 1, wherein said $2^n$ memories are activated in sequence within a memory cycle from clock signals supplied by said management unit, and wherein said management unit alters said activation sequence in response to a jump instruction so that the first memory activated thereafter is that containing said target instruction.

3. The device as claimed in claim 1, wherein said $2^n$ instructions are read simultaneously and in parallel in said first storage means, and wherein said second means supply the address of the first of said $2^n$ instructions and wherein said second means further includes third means for selecting the $2^n$ following instructions in the absence of a jump instruction and for selecting $2^n$ successive instructions commencing with said target instruction in the presence of a jump instruction.

4. The device as claimed in claim 3, wherein each of said $2^n$ memories is a separate memory each equipped with an address decoder and a program counter the output of which is linked, via an incrementer circuit, to said address decoders of the $2^n-1$ first memories and directly to the last memory, wherein said management unit supplies said program counter with the code of the line containing the first of said $2^n$ instructions as well as a signal for activation of said circuits incrementing the memories situated ahead of the memory containing first said instruction.

5. The device as claimed in claim 4, wherein said third selection means consist of $2^n$ multiplexers (Mux i) with $2^n$ inputs controlled by the code, indicating the memory of the first of said $2^n$ instructions to be selected, supplied by said management unit.

6. The device as claimed in claim 1, wherein said management unit comprises a multiplexer circuit loaded by said first storage means and able to supply said $2^n$ instructions successively to said processing unit, at least one instruction decoder delivering a jump signal in response to a jump instruction supplied by said multiplexer circuit and a control automaton which, in response to said jump signal, activates said first means and blocks said processing unit until said target instruction is available in said multiplexer circuit.

7. The device as claimed in claim 6, wherein said management unit comprises $2^n$ decoders in parallel and $2^n$ multiplexers controlled by said $2^n$ decoders and arranged in such a way as to deliver the jump address of the first of a plurality of jump instructions loaded into said multiplexer circuit.

8. The device as claimed in claim 1, wherein said first means constitute a cache memory of said processing unit.

9. The device as claimed in claim 1 wherein said $2^n$ memories each operate at a clock frequency of $F/2^n$.

10. The device of claim 1 wherein said $2^n$ memories are embodied as sections of a single memory that is capable of delivering $2^n$ instructions in parallel.

11. A device for executing a program of A instructions, comprising:

first means of storing the Program which are able, in one memory cycle, to deliver $2^n$ instructions in parallel, a unit for processing the instructions; and second means for supplying successive instructions to the processing unit, wherein said second means comprise a management unit sensitive to a jump instruction belonging to said $2^n$ instructions delivered by said first means, and capable of activating said first means so that the target instruction designated by said jump instruction is the first of the following $2^n$ instructions delivered by said first means, said processing unit being capable of processing $2^n$ instructions in one memory cycle;

said $2^n$ instructions being read simultaneously and in parallel in said first storage means, and wherein said second means supply the address of the first of said $2^n$ instructions, and wherein said second means further includes third means for selecting the $2^n$ following instructions in the absence of a jump instruction and for selecting $2^n$ successive instructions commencing with said target instruction in the presence of a jump instruction; and wherein said first storage means comprise a single memory the rows of which contain $2 \times 2^{n-1}$ successive instructions, the last $2_{n-1}$ instructions of a row being identical to the first $2^{n-1}$ instructions of the following row, and wherein said third selection means select the $2^n$ instructions from a window the position of which is determined by the address of the first of said $2^n$ instructions supplied by said management unit.

12. The device as claimed in claim 11, wherein said third selection means consist of $2^n$ multiplexers with $2^n$ inputs controlled by the code of the address of said first of said $2^n$ instructions.

* * * * *